United States Patent

Ru et al.

[11] Patent Number: 6,138,607
[45] Date of Patent: Oct. 31, 2000

[54] DEVICE FOR AUTOMATICALLY PREPARING AND FEEDING LIQUID FEED STUFF FOR PIGLETS

[75] Inventors: Yong-Hee Ru; Duck-Soo Lee; Jung-Dae Han, all of Suwon, Rep. of Korea

[73] Assignee: Republic of Korea represented by Rural Developement Administration, Kyunggi-Do, Rep. of Korea

[21] Appl. No.: 09/176,803

[22] Filed: Oct. 22, 1998

[30] Foreign Application Priority Data

Aug. 24, 1998 [KR] Rep. of Korea ................ 98-15876

[51] Int. Cl.[7] ............................................. A01K 5/02
[52] U.S. Cl. ................................ 119/57.4; 119/51.11
[58] Field of Search ...................... 119/51.11, 51.5, 119/902, 57.1, 57.4

[56] References Cited

U.S. PATENT DOCUMENTS

| | | | |
|---|---|---|---|
| 3,208,431 | 9/1965 | Kloss ............................ | 119/51.5 X |
| 3,524,432 | 8/1970 | Tartar .............................. | 119/51.11 |
| 4,181,097 | 1/1980 | Betsuno .......................... | 119/51.11 |
| 4,640,229 | 2/1987 | Swartzendruber et al. ...... | 119/51.11 |

*Primary Examiner*—Robert P. Swiatek
*Attorney, Agent, or Firm*—Nawrocki, Rooney & Sivertson, P.A.

[57] ABSTRACT

A device for automatically preparing and feeding liquid feed stuff for piglets. The device conserves labor and time while feeding the weanling piglets and improves both the feeding effect for SEW piglets and the feeding and mothering effect for weakened or motherless piglets. The device has a warm water supply unit, a dry feed stuff supply unit, and a mixing unit. The mixing unit repeatedly receives predetermined amounts of warm water and dry feed stuff from associated units under the control of a main controller at predetermined intervals prior to appropriately mixing the dry feed stuff with the warm water every time, thus forming liquid feed stuff prior to selectively supplying the liquid feed stuff to a plurality of feeding troughs for piglets.

4 Claims, 5 Drawing Sheets

DEVICE FOR AUTOMATICALLY PREPARING AND FEEDING LIQUID FEED STUFF FOR PIGLETS

BACKGROUND OF THE INVENTION

1. Field of the Invention

The present invention relates, in general, to a device for preparing and feeding liquid feed stuff for piglets and, more particularly, to a device capable of automatically preparing liquid feed stuff for piglets by appropriately mixing dry feed stuff with warm water, both being automatically supplied to the device at a predetermined time, and automatically feeding the resulting liquid feed stuff to piglets, thus improving the feeding effect for the weanling piglets, the device being also easily cleaned, thus preparing sanitary feed stuff rarely causing diseases in piglets.

2. Description of the Prior Art

The days after birth, when starting to wean piglets, have been desirably shortened in accordance pith a technical development in the swine industry.

Furthermore, a segregation early weaning process (SEW process) has been proposed and is in the early stages of being used practically. Such an SEW process is advantageous in that it somewhat radically protects the piglets from a vertical infection from mother pigs. Particularly, some experimental documents disclose that the piglets are almost completely protected from infectious gastroenteritis, Ozeski virus, P.R.R.S virus, pasteurellosis, atrophic rhinitis and etc. when the piglets are segregated from the mother pigs before 10 days after birth so as to initially wean the piglets through the SEW process. It is thus necessary to further reduce the days after birth when starting to wean piglets.

When segregating piglets before 10 days after birth to artificially feed the weanling piglets through the SEW process, it is necessary not only to consider that such piglets cannot completely digest dry feed stuff, but also to make the artificial feeding intervals meet with the natural intervals offered by mother pigs as explained in the following table 1.

TABLE 1

| Time | Feeding intervals offered by mother pigs for their weanling piglets | | | | | | |
|---|---|---|---|---|---|---|---|
| | Weeks after birth | | | | | | |
| (min.) | 1 | 2 | 3 | 4 | 5 | 6 | Avg. |
| Day | 48 | 54 | 51 | 58 | 54 | 56 | 51 |
| Night | 39 | 46 | 53 | 52 | 56 | 60 | 51 |
| Avg. | 44 | 50 | 52 | 55 | 55 | 58 | 52 |

From the above table, it is noted that in order to artificially wean and mother the piglets in an effective manner similar to that offered by mother pigs, it is necessary to prepare liquid feed stuff by appropriately and manually mixing dry feed stuff with water and manually feed the resulting feed stuff to the piglets twenty four times per day at regular intervals of 1 hour.

However, it is very difficult for farmers to perform such a regular and repeated artificial feeding function for piglets everyday, so that the farmers sometimes disregard the regular and repeated feeding work. This fails to accomplish a desired effect of such an SEW process, but causes a problem in that the weanling piglets may weaken.

That is, a desired effect of the SEW process for piglets has not been yet accomplished until consuming much labor and time and this remarkably reduces profitability of the swine industry. Such an SEW process is thus not widely used in hoggeries in the prior art.

The above-mentioned problems experienced in the SEW process also occur in feeding weakened or motherless piglets.

In an effort to overcome the above problems, several types of devices for preparing and feeding liquid feed stuff for piglets are proposed. Such devices are individually designed to supply dry feed stuff and cold water to a mixer through supply pipes prior to mixing the dry feed stuff with cold water into liquid feed stuff. Due to the low temperature of water, the dry feed stuff fails to be completely and uniformly mixed with water, thus partially lumping. Such liquid feed stuff with lumps is not suitable for being used for feeding piglets. Another problem of the above devices is that they fail to fully automatically and reliably prepare and feed liquid feed stuff for piglets at predetermined intervals so that the devices fail to radially overcome the problems experienced in the manual preparation and feeding of liquid feed stuff for piglets.

Furthermore, the above devices are expensive and fail to feed many piglets at the same time. Therefore, when needing to feed many piglets at the same time using the devices, it is necessary to install two or more devices in a hoggery and this forces greater expenses on swine farmers for the devices. The above devices are thus rarely used in hoggeries.

SUMMARY OF THE INVENTION

Accordingly, the present invention has been made keeping in mind the above problems occurring in the prior art, and an object of the present invention is to provide a device for preparing and feeding liquid feed stuff for piglets, which automatically prepares such liquid feed stuff by appropriately mixing dry feed stuff with warm water, both being automatically supplied to the device at a predetermined time, and automatically feeds the resulting liquid feed stuff to piglets, thus conserving labor and time while feeding the weanling piglets and improving both the feeding effect for SEW piglets and the feeding and mothering effect for weakened or motherless piglets.

Another object of the present invention is to provide a device for preparing and feeding liquid feed stuff for piglets, which has a simple construction and is easily assembled and disassembled, thus being easily cleaned and preparing sanitary feed stuff rarely causing diseases of piglets.

In order to accomplish the above object, the present invention provides a device for automatically preparing liquid feed stuff for piglets by mixing dry feed stuff with water, and feeding the liquid feed stuff to piglets, comprising: a warm water supply unit automatically heating fresh water to a predetermined temperature, thus preparing warm water prior to supplying the warm water; a dry feed stuff supply unit automatically supplying the dry feed stuff; and a mixing unit repeatedly receiving predetermined amounts of warm water and dry feed stuff from the warm water supply and dry feed stuff supply units under the control of a main controller at predetermined intervals prior to appropriately mixing the dry feed stuff with the warm water every time, thus forming liquid feed stuff prior to selectively supplying the liquid feed stuff to a plurality of feeding troughs for piglets.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
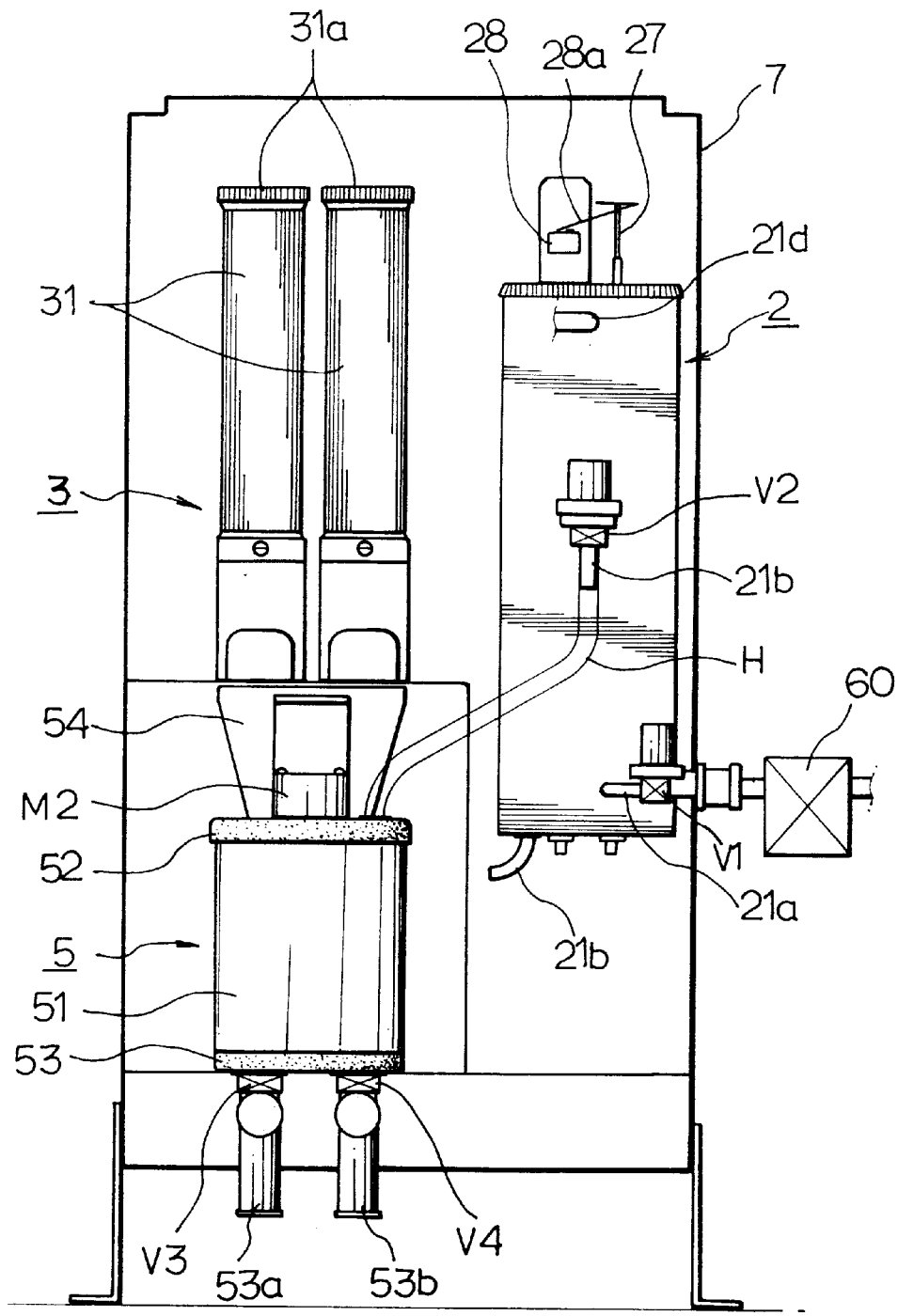
FIG. 1 is a sectional view showing the construction of a device in accordance with the preferred embodiment of the present invention.

FIG. 1 is a sectional view showing the construction of a device in accordance with the preferred embodiment of this invention. As shown in the drawing, the device of this invention comprises several units: a warm water supply unit 2 or a first unit, a dry feed stuff supply unit 3 or a second unit, and a mixing unit 5 or a third unit. The warm water supply unit 2 automatically heats fresh water to a predetermined temperature, thus preparing warm water prior to supplying the warm water to the mixing unit 5. The dry feed stuff supply unit 3 automatically supplies dry feed stuff to the mixing unit 5. The above mixing unit 5 repeatedly receives predetermined amounts of warm water and dry feed stuff from the two units 2 and 3 under the control of a main controller (not shown) at predetermined intervals prior to appropriately mixing dry feed stuff with warm water every time. The mixing unit 5, thereafter, selectively supplies the liquid feed stuff to a plurality of feeding troughs 4 for piglets.

In a detailed description, the warm water supply unit 2 comprises a water tank 21. A water inlet pipe 21a, connected to a city water pipe line, is set on the bottom wall of the tank 21, while a warm water outlet pipe 21b, extending from the top wall of the tank 21 to the mixing unit 4, is provided on the top wall of the tank 21. The water tank 21 also comprises a heater 23, a temperature sensor 24 and a water level controller 25. The heater 23 is interiorly installed in the lower portion of the tank 21, while the sensor 24 is mounted in the upper portion of the tank 21 and is used for sensing the temperature of water in the tank 21 prior to selectively starting the heater 23 to heat the water in the tank 21. The water level controller 25 maintains a predetermined water level in the tank 21.

The water inlet pipe 21a of the tank 21 is provided with a first solenoid valve V1, while the warm water outlet pipe 21b is provided with a second solenoid valve V2. The two solenoid valves V1 and V2 selectively close the inlet and outlet pipes 21a and 21b, respectively. A filter 60 is set in the water inlet pipe 21a so as to filter off impurities from water which passes through said pipe 21a.

Figure 2:
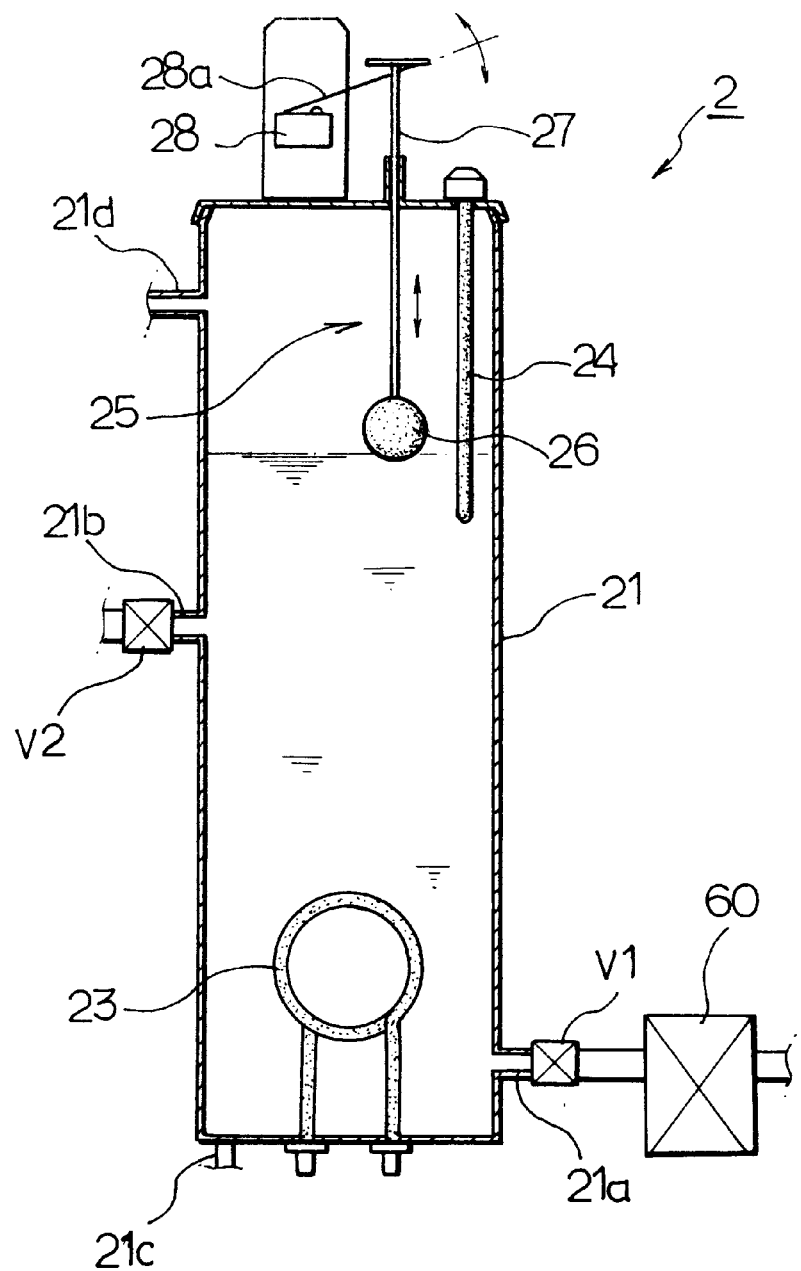
FIG. 2 is a sectional view showing the construction of a warm water supply unit included in the device of this invention.

The water level controller 25 comprises a vertical rod 27 connected to a float 26 positioned inside the tank 21 as shown in FIG. 2. A switch 28, used for controlling the first solenoid valve V1 of the water inlet pipe 21a, is provided on the top wall of the tank 21 and has a push plate 28a coupled to the top end of the vertical rod 27. The top end of the vertical rod 27 thus selectively presses or releases the push plate 28a so as to turn on or off the switch 28 in accordance with the water level in the tank 21.

Figure 3:
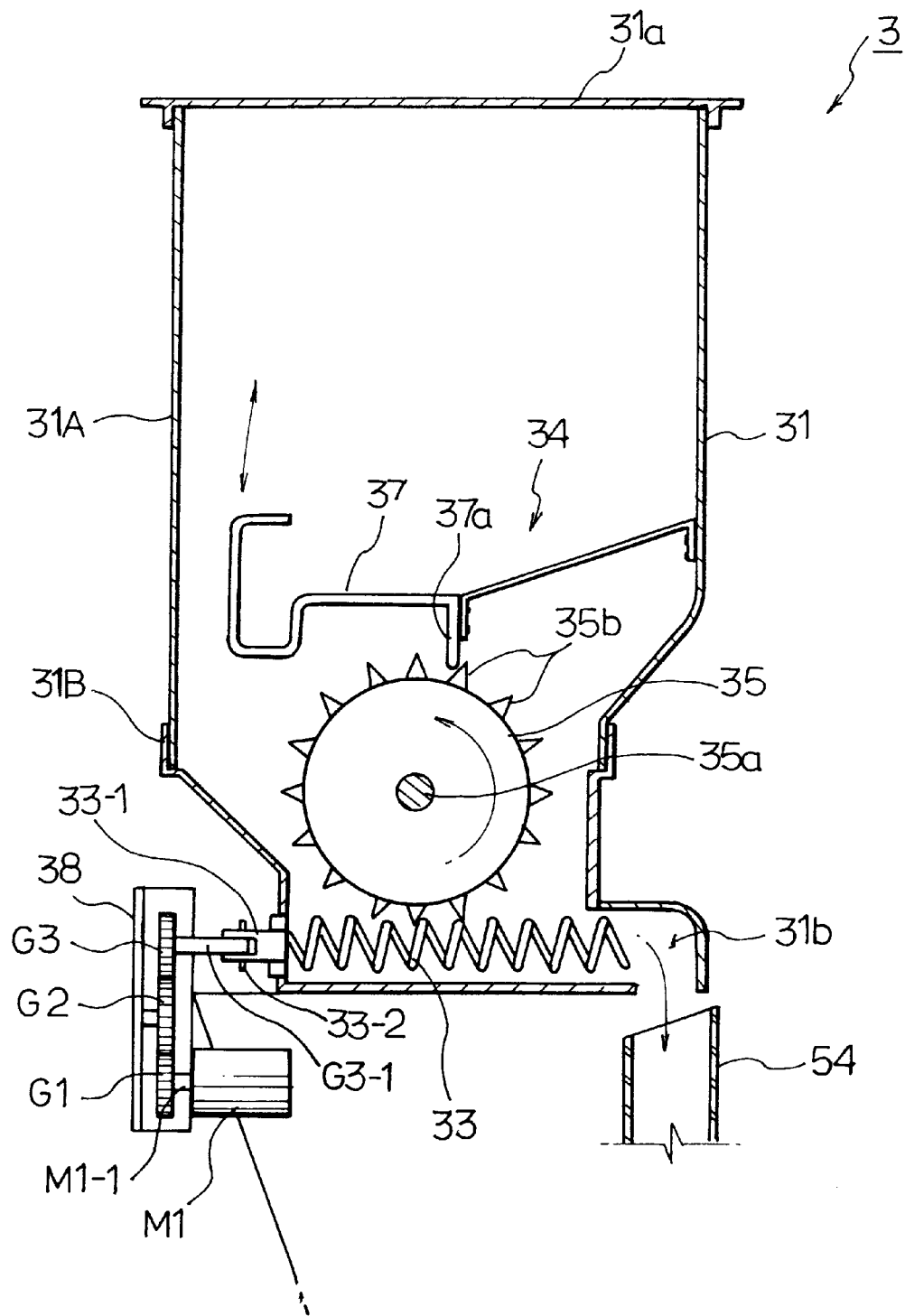
FIG. 3 is a sectional view showing the construction of a dry feed stuff supply unit included in the device of this invention.

The dry feed stuff supply unit 3 comprises a plurality of dry feed stuff tanks 31 as shown in FIG. 1. The construction of each of the dry feed stuff tanks 31 is shown in FIG. 3. As shown in FIG. 3, each of the tanks 31 comprises two bodies: upper and lower bodies 31A and 31B which are detachably assembled with each other. The upper body 31A has an openable top lid 31a, while the lower body 31B has a feed stuff outlet port 31b at its bottom wall. A screw feeder 33, operated in conjunction with a first drive motor M1, is interiorly and horizontally arranged on the bottom of each tank 31 with the free end of the feeder 33 being positioned around the outlet port 31b. A vibrating and breaking means 34 is positioned above the screw feeder 33 and is used for vibrating and breaking the dry feed stuff in the tank 31 in accordance with a rotating action of the motor-operated screw feeder 33.

The above vibrating and breaking means 34 comprises a rotating wheel 35. Said wheel 35 is idle-rotatably fitted over a shaft 35a and has a plurality of teeth 35b on its external surface. The teeth 35b of the wheel 35 engage with the threads of the screw feeder 33, thus allowing the wheel 35 to be rotatable in conjunction with the screw feeder 33. That is, the screw feeder 33 and the wheel 35 form a worm gear system. Provided above the rotating wheel 35 in each tank 31 is a vibrating and breaking member 37. The above member 37 has a specifically designed configuration and is interiorly fixed to a bracket of the tank 31 through a cantilever-type fixing method. One end of the panel 37 is bent at right angles in a vertical and downward direction, thus forming a resilient hook 37a. The hook 37a engages with the teeth 35b of the wheel 35 in a way such that the wheel 35 rotates while clicking the hook 37a. Due to such a clicking motion of the hook 37a in conjunction with the wheel 35, said member 37 is regularly vibrated upwardly and downwardly in accordance with a rotating action of the wheel 35.

The rotational force of the motor M1 is transmitted to the screw feeder 33 through a gear train. The above gear train comprises three gears: a drive gear G1, a driven gear G3 and an intermediate gear G2. The drive gear G1 is integrally fitted over the output shaft M1-1 of the first drive motor M1, while the shaft G3-1 of the driven gear G3 is coupled to the shaft 33-1 of the screw feeder 33 using a joint pin 33-2. The drive gear G1 engages with the driven gear G3, with the intermediate gear G2 being interposed between the two gears G1 and G3 and engaging with both gears G1 and G3.

The above first motor M1 is controlled by a controller (not shown) so that the rpm (revolutions per minute) of the screw feeder 33 is automatically controlled.

Figure 4:
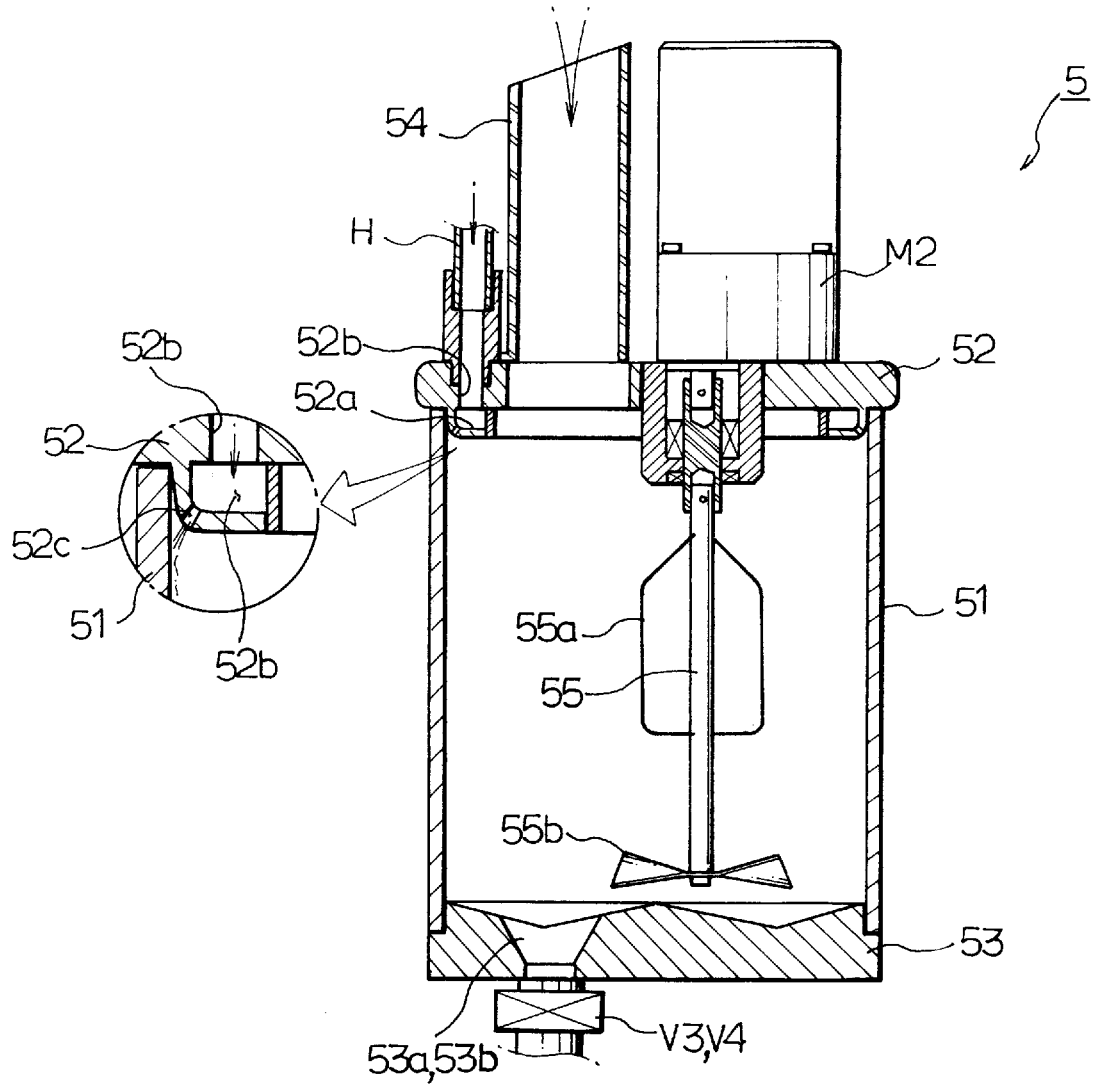
FIG. 4 is a sectional view showing the construction of a mixing unit for mixing dry feed stuff with warm water in the device of this invention.
Figure 5:
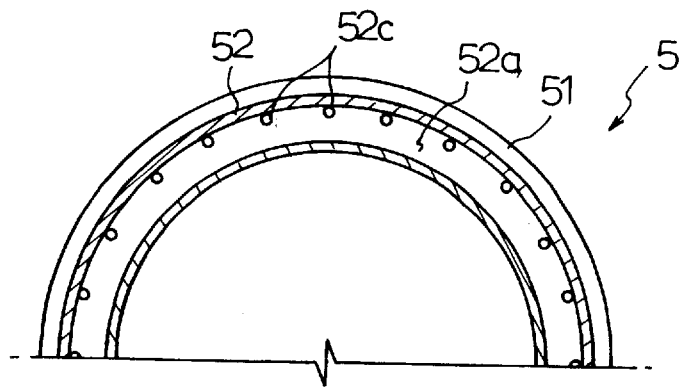
FIG. 5 is a sectional view showing the construction of a top lid of the above mixing unit.

The construction of the mixing unit 5 is shown in FIGS. 4 and 5. As shown in the drawings, the mixing unit 5 comprises an agitating tank 51. The agitating tank 51 is made of a transparent material and is closed by a cover 52, 53 at each of the top and bottom ends thereof. The top cover 52 has a water inlet port 52b which is connected to the warm water outlet port 21b of the water supply unit 2 through a connection hose "H". The top cover 52 also has a hopper 54 which is positioned under the feed stuff outlet port 31b of the dry feed stuff supply unit 3. A second motor M2 is exteriorly mounted on the top cover 52, while a shaft 55, having a plurality of agitating blades 55a and 55b, extends vertically in the tank 51. The above shaft 55 is operated by the rotating force of the motor M2. A plurality of distributing ports 53a and 53b, individually opened under the control of a solenoid valve V3, V4, is formed on the bottom cover 53 of the tank 51, thus selectively discharging liquid feed stuff from the tank 51.

A circular water passage 52a is formed in the top cover 52 along the edge of said cover 52 and communicates with the water inlet port 52b, thus receiving warm water from the water supply unit 2. The inside edge of the cover 52 is regularly holed to form a plurality of nozzles 52c. The above nozzles 52c communicate with the passage 52a and are opened toward the side wall of said tank 51.

Figure 6:
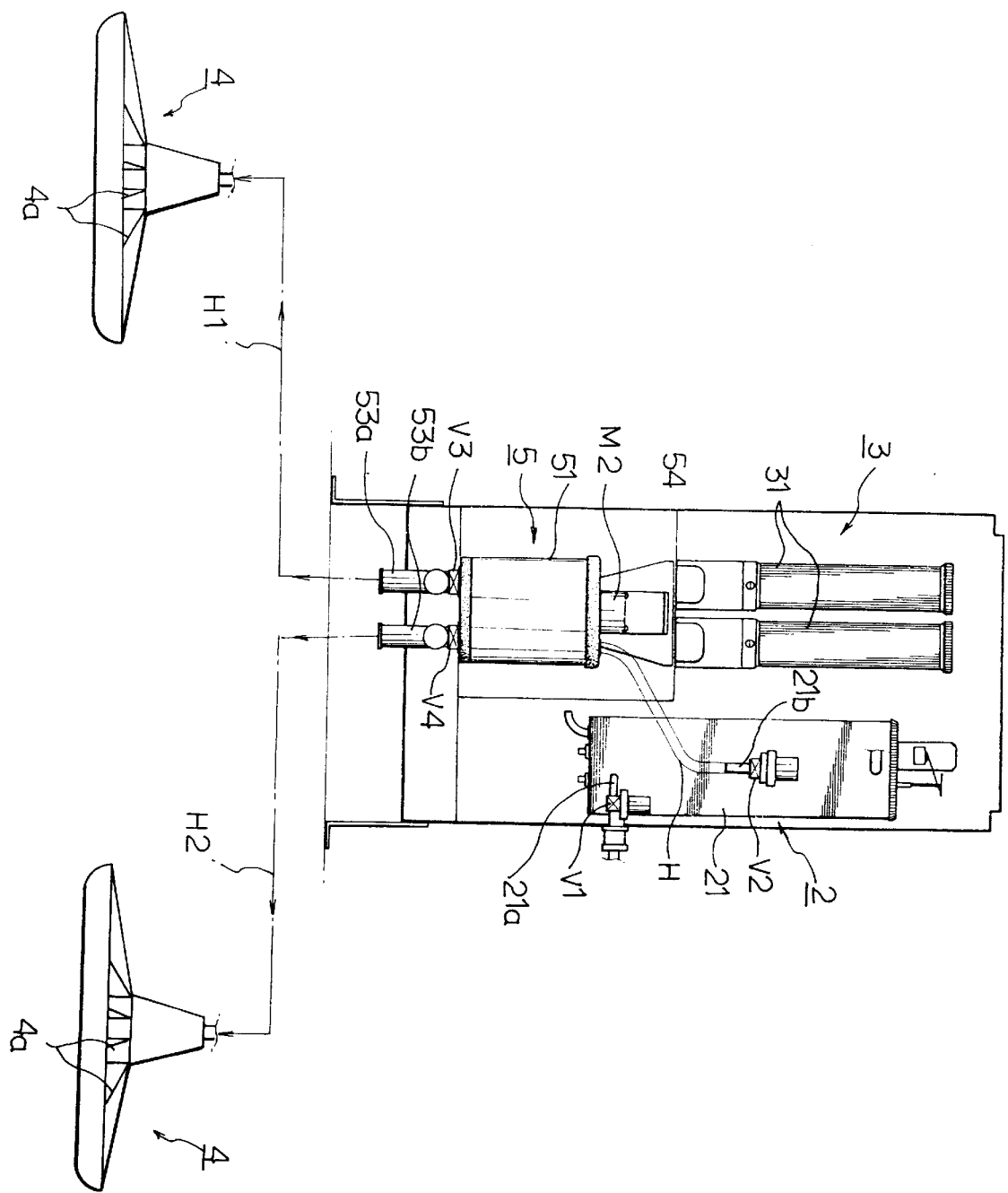
FIG. 6 is a view showing the operation of the device according to this invention.

Each of the distributing ports 53a and 53b of the tank 51 is connected to an associated feeding trough 4 through a feeding hose H1, H2. In the preferred embodiment, the circular feeding troughs 4 are individually sectioned into a plurality of sectors through a plurality of radially extending partition walls 4a as shown in FIG. 6. However, it should be understood that such feeding troughs 4 may be variously designed without affecting the functioning of this invention.

In the device of this invention, the solenoid valves V1 to V4, the motors M1 and M2, and the switch 28 are commonly controlled by the main controller (not shown).

In the drawings, the reference numeral 7 denotes a frame of the device, numeral 21d denotes an overflow relieving pipe which is formed on a top portion of the water tank 21 and is used for discharging overflown water from the tank 21, and numeral 38 denotes a gear box.

The operational effect of the above device will be described hereinbelow.

The water inlet pipe 21a of the water tank 21 is connected to a city water pipe line (not shown) prior to opening the first solenoid valve V1 under the control of the controller, thus supplying freshwater into the water tank 21.

In such a case, the filter 60, set in the water inlet pipe 21a, effectively filters off impurities from water passing through said pipe 21a.

Such a supply of fresh water for the water tank 21 is continued until the water level reaches a reference level predetermined by the water level controller 25. That is, as water is supplied into the tank 21, the float 26, floating on the water level, gradually rises along with the vertical rod 27 until the water level reaches the reference level. When the water level completely reaches the reference level, the top end of the vertical rod 27 releases the push plate 28a of the switch 28, thus turning off the switch 28. The first solenoid valve V1 of the warm water outlet pipe 21a is thus closed under the control of the main controller (not shown) and this stops supply of water to the tank 21.

Water in the tank 21 is, thereafter, heated by the heater 23 so that the temperature of the water gradually rises until the temperature reaches a reference point. In such a case, the temperature of water is sensed by the temperature sensor 24.

On the other hand, the openable top lids 31a of the dry feed stuff tanks 31 are opened prior to pouring a predetermined amount of dry feed stuff into each of said tanks 31.

Thereafter, the device is automatically operated under the control of the main controller. In such a case, both the feeding intervals for piglets and the amounts of dry feed stuff and warm water for the agitating tank 51 are preset in the main controller by the user so that the device automatically controls the device to repeatedly prepare and feed the liquid feed stuff for piglets.

That is, after the controller confirms the feeding intervals for piglets, the controller automatically opens the second solenoid valve V2 of the warm water outlet pipe 21b so as to supply a predetermined amount of warm water from the tank 21 to the agitating tank 51 through the hose "H".

After the predetermined amount of warm water is completely supplied from the water tank 21 to the agitating tank 51, the second solenoid valve V2 is automatically closed by the controller, thus stopping supply of warm water for the agitating tank 51.

In such a case, the water level of the water tank 21 descends to a lower level due to the above-mentioned supply of warm water for the agitating tank 51 so that the vertical rod 27 moves downwardly along with the float 26. The vertical rod 27 thus presses the push plate 28a downwardly and this allows said plate 28a to turn on the switch 28. The first solenoid valve V1 of the water inlet pipe 21a is thus automatically opened so that fresh water is newly supplied into the tank 21 until the water level in the tank 21 reaches the reference level. Therefore, the water tank 21 automatically maintains the reference water level.

When the water temperature in the tank 21 is reduced by the newly supplied water, the temperature sensor 24 senses the reduced water temperature and outputs a signal to the heater 23, thus making the heater 23 reheat the water to the reference point. Therefore, the water tank 21 automatically maintains the reference temperature of water.

At the same time as supplying the predetermined amount of warm water for the agitating tank 51 of the mixing unit 5, a predetermined amount of dry feed stuff is automatically supplied from the dry feed stuff supply unit 3 into said agitating tank 51. That is, in each of the dry feed stuff tanks 31 of said unit 3, the screw feeder 33 is started by the first drive motor M1 so as to move the dry feed stuff to the outlet port 31b of each tank 31.

In such a case, the teeth 35b of the wheel 35 engage with the threads of the screw feeder 33, so that the wheel 35 is rotated in conjunction with the screw feeder 33. In addition, the hook 37a of the vibrating and breaking member 37 engages with the teeth 35b of the wheel 35 so that the hook 37a is clicked by the wheel 35 during the rotating action of the wheel 35. Due to such a clicking motion of the hook 37a, the vibrating and breaking member 37 is regularly vibrated upwardly and downwardly around the fixed point thereof. The lumped dry feed stuff is effectively and uniformly broken into small pieces prior to being dropped onto the bottom of the tank 31. Such a broken dry feed stuff is easily and smoothly fed to the outlet port 31b of the tank 31 by the screw feeder 33.

The dry feed stuff is, thereafter, discharged from the tank 31 through the outlet port 31b and is dropped into the agitating tank 51 of the mixing unit 5 through the hopper 54.

In such a case, the amount of dry feed stuff to be supplied from the dry feed stuff tank 31 into the agitating tank 51 every time is automatically controlled by the controller since the controller controls the first drive motor M1 so as to rotate the screw feeder 33 for a predetermined time.

When a predetermined amount of dry feed stuff is completely supplied into the agitating tank 51, the first drive motor M1 along with the screw feeder 33 is stopped, thus stopping supply of dry feed stuff for the agitating tank 51. Therefore, it is possible to maintain the predetermined amount of dry feed stuff to be supplied into the agitating tank 51 at every process.

On the other hand, warm water from the water tank 21 is primarily supplied into the circular passage 52a formed in the top cover 52 of said agitating tank 51 through the hose "H". The warm water is, thereafter, sprayed onto the interior surface of the side wall of said tank 51 through the regularly spaced nozzles 52c.

Since the warm water is sprayed onto the interior surface of the side wall of said tank 51 through the nozzles 52c, it is possible to flush the inside wall of the tank 51, thus effectively removing dry feed stuff from said inside wall and automatically cleaning the interior of the tank 51. In addition, such a flushing effect also allows a user to easily observe the interior of the transparent tank 51 outside said tank 51.

When the predetermined amounts of warm water and dry feed stuff are initially supplied into the agitating tank 51, the second drive motor M2 is started to rotate the agitating shaft 55 provided with the agitating blades 55a and 55b. Therefore, the warm water and the dry feed stuff are uniformly and effectively stirred up and mixed with each other, thus preparing liquid feed stuff suitable for weanling piglets.

In such a case, the operating time of the second drive motor M2 is stored in the main controller of the device so that the second motor M2 rotates the agitating shaft 55 for a predetermined time prior to being automatically stopped.

When the desired liquid feed stuff suitable for weanling piglets is completely prepared in the agitating tank 51 of the mixing unit 5, the solenoid valves V3 and V4 of the bottom cover 53 of said tank 51 are orderly and selectively opened by a program preset in the controller, thus selectively opening the distributing ports 53a and 53b. Therefore, an appropriate amount of resulting liquid feed stuff is discharged from the tank 51 through an open port 53a, 53b prior to being fed to an associated feeding trough 4 through the hose H1, H2.

When a feeding trough 4 is provided in each cell of a hoggery, the controller of this device precisely and controllably supplies liquid feed stuff for each cell of the hoggery by selectively opening the distributing ports 53a and 53b. The device of this invention thus automatically feeds a great number of piglets at the same time in the similar manner to that offered by mother pigs.

In each of the dry feed stuff tanks 31 of the dry feed stuff supply unit 3, the openable top lid 31a, the upper body 31A and the lower body 31B are easily detachably assembled with each other into a tank. In addition, the top and bottom covers 52 and 53 of the agitating tank 51 are designed to be easily removed from said tank 51 when necessary. Therefore, it is possible for a user to easily clean the interior of the tanks 31 and 51. Furthermore, since warm water from the warm water supply unit 2 is introduced into the agitating tank 51, the feeding hoses H1 and H2, and the feeding troughs 4, the warm water automatically washes said tank 51, said feeding hoses H1 and H2, and said feeding troughs 4. This allows the device of this invention to prepare and feed sanitary liquid feed stuff for piglets.

As described above, the present invention provides a device for automatically preparing and feeding liquid feed stuff for piglets. The device automatically prepares such liquid feed stuff by appropriately mixing dry feed stuff with warm water, both being automatically supplied to the device at a predetermined time, and automatically feeds the resulting liquid feed stuff to piglets, thus conserving labor and time while feeding the weanling piglets. The device improves both the feeding effect for SEW piglets and the feeding and mothering effect for weakened or motherless piglets.

Another advantage of the device resides in that the device has a simple construction and is easily assembled and disassembled, thus being easily cleaned and preparing sanitary feed stuff rarely causing diseases of piglets.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for automatically preparing liquid feed stuff for piglets by mixing dry feed stuff with water, and feeding the liquid feed stuff to piglets, comprising:

a warm water supply unit automatically heating fresh water to a predetermined temperature, thus preparing warm water prior to supplying the warm water;

a dry feed stuff supply unit automatically supplying the dry feed stuff; and a mixing unit repeatedly receiving predetermined amounts of warm water and dry feed stuff from said warm water supply unit and said dry feed stuff supply unit under the control of a main controller at predetermined intervals prior to appropriately mixing the dry feed stuff with the warm water every time, thus forming liquid feed stuff prior to selectively supplying the liquid feed stuff to a plurality of feeding troughs for piglets;

wherein said warm water supply unit comprises:

a water tank provided with both a water inlet pipe and a warm water outlet pipe, said water inlet pipe being connected to a fresh water supply source and being selectively opened by a first solenoid valve, and said warm water outlet pipe extending to said mixing unit and being selectively opened by a second solenoid valve;

a heater interiorly installed in said water tank so as to heat water in the water tank to a predetermined temperature;

a temperature sensor mounted in said water tank and used for sensing the temperature of water in the water tank prior to selectively starting said heater to heat the water in the water tank; and a water level controller adapted for maintaining a predetermined water level in the water tank;

wherein said water level controller comprises:

a vertical rod connected to a float positioned inside the water tank; and a switch used for controlling said first solenoid valve of the water inlet pipe, said switch being provided on said water tank and having a push plate coupled to a top end of said vertical rod so that the top end of said vertical rod selectively presses or releases the push plate in accordance with a water level in the water tank, thus turning on or off said switch.

2. A device for automatically preparing liquid feed stuff for piglets by mixing dry feed stuff with water, and feeding the liquid feed stuff to piglets, comprising:

a warm water supply unit automatically heating fresh water to a predetermined temperature, thus preparing warm water prior to supplying the warm water;

a dry feed stuff supply unit automatically supplying the dry feed stuff; and a mixing unit repeatedly receiving predetermined amounts of warm water and dry feed stuff from said warm water supply unit and said dry feed stuff supply unit under the control of a main controller at predetermined intervals prior to appropriately mixing the dry feed stuff with the warm water every time, thus forming liquid feed stuff prior to selectively supplying the liquid feed stuff to a plurality of feeding troughs for piglets;

wherein said dry feed stuff supply unit comprises:

a plurality of dry feed stuff tanks, said dry feed stuff tanks individually comprising upper and lower bodies detachably assembled with each other, said upper body having an openable top lid and said lower body having a feed stuff outlet port;

a screw feeder operated in conjunction with a first drive motor and interiorly and horizontally arranged on a bottom wall of each of said dry feed stuff tanks with a free end of the screw feeder being positioned around the feed stuff outlet port; and a vibrating and breaking means positioned above the screw feeder and adapted for vibrating and breaking the dry feed stuff in each of said feed stuff tanks in accordance with a rotating action of the screw feeder;

wherein said vibrating and breaking means comprises:

a rotating wheel idle-rotatably fitted over a shaft and has a plurality of teeth on an external surface thereof, said teeth of the wheel engaging with threads of said screw feeder, thus allowing the wheel to be rotatable in conjunction with the screw feeder; and a vibrating and breaking member provided above said rotating wheel in each of said feed stuff tanks by being fixed to the feed stuff tank through a cantilever-type fixing method, said member being bent in a vertical and downward direction at a fixed end thereof, thus forming a hook, said hook engaging with the teeth of said rotating wheel in a way such that the wheel rotates while clicking the hook and allowing said member to be regularly vibrated upwardly and downwardly in conjunction with a rotating action of the wheel, thus breaking lumped dry feed stuff into small pieces prior to supplying the dry feed stuff to the mixing unit.

3. A device for automatically preparing liquid feed stuff for piglets by mixing dry feed stuff with water, and feeding the liquid feed stuff to piglets, comprising:

a warm water supply unit automatically heating fresh water to a predetermined temperature, thus preparing warm water prior to supplying the warm water;

a dry feed stuff supply unit automatically supplying the dry feed stuff; and a mixing unit repeatedly receiving predetermined amounts of warm water and dry feed stuff from said warm water supply unit and said dry feed stuff supply unit under the control of a main controller at predetermined intervals prior to appropriately mixing the dry feed stuff with the warm water every time, thus forming liquid feed stuff prior to selectively supplying the liquid feed stuff to a plurality of feeding troughs for piglets;

wherein said mixing unit comprises:

an agitating tank made of a transparent material and closed by top and bottom covers at top and bottom ends thereof, respectively, said top cover having both a water inlet port connected to a warm water outlet port of said warm water supply unit and a hopper positioned under a dry feed stuff outlet port of said dry feed stuff supply unit, and said bottom cover having a plurality of distributing ports individually opened under the control of a solenoid valve, thus selectively discharging liquid feed stuff from the agitating tank;

a second motor exteriorly mounted on said top cover of the agitating tank; and an agitating shaft extending vertically in said agitating tank and having a plurality of agitating blades in said agitating tank, said agitating shaft being rotatable in conjunction with said second motor.

4. The device according to claim 3, wherein said top cover of the agitating tank is provided with a circular water passage and a plurality of nozzles, said water passage being formed along an edge of the top cover to communicate with said water inlet port of the top cover, thus receiving warm water from the warm water supply unit, and said nozzles being formed along an inside edge of said top cover so as to be opened toward a side wall of said agitating tank and communicate with the water passage.

* * * * *